Feb. 15, 1944.　　　　W. DENNIS　　　　2,341,698
PRODUCTION OF LIQUID CARBON DIOXIDE
Filed Dec. 8, 1941
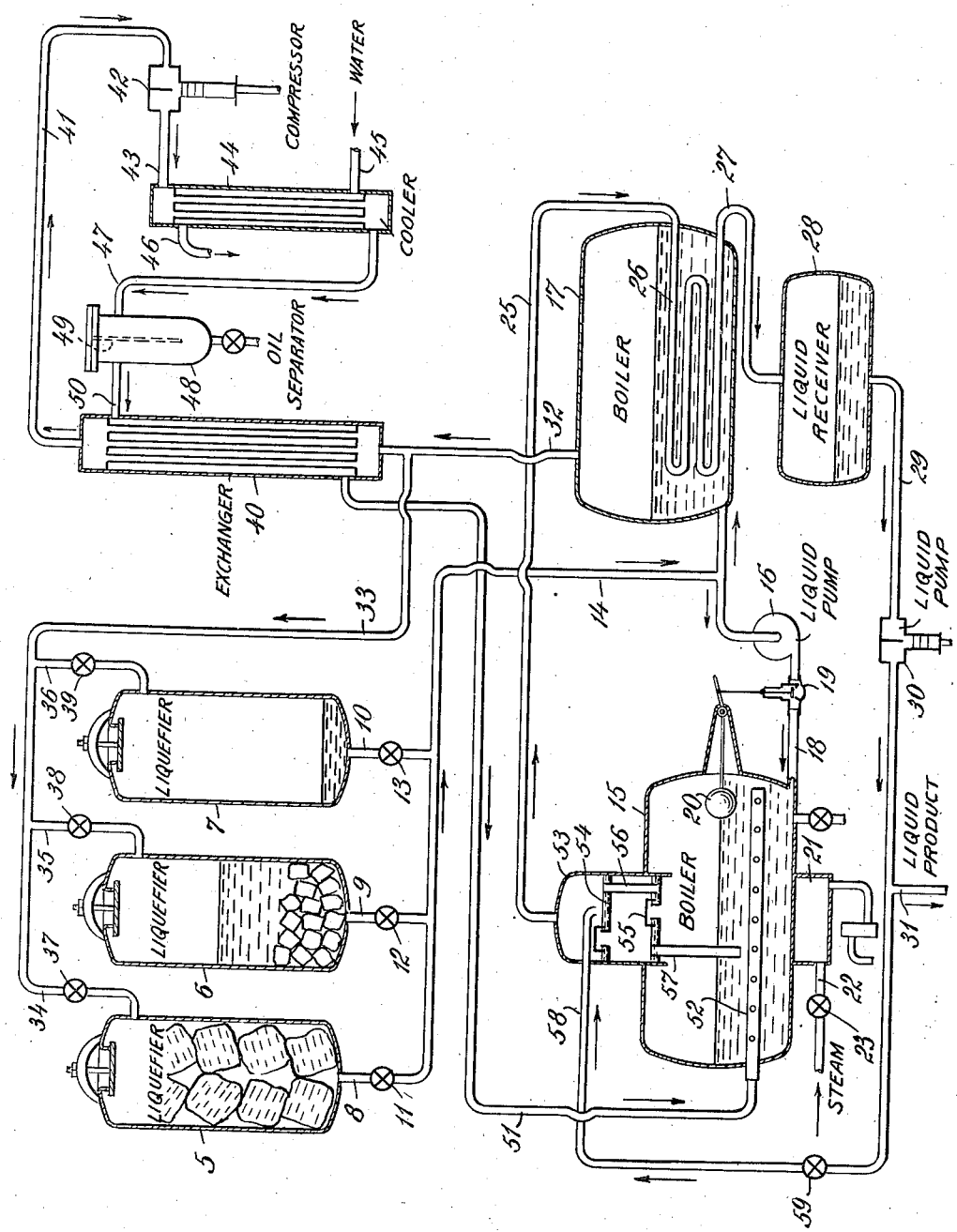
INVENTOR
Wolcott Dennis
BY
Pennie Davis Marvin & Edmonds
ATTORNEYS Patented Feb. 15, 1944

2,341,698

UNITED STATES PATENT OFFICE 2,341,698

PRODUCTION OF LIQUID CARBON DIOXIDE

Wolcott Dennis, Darien, Conn., assignor to Air Reduction Company, Incorporated, New York, N. Y., a corporation of New York Application December 8, 1941, Serial No. 422,065

15 Claims. (Cl. 62—91.5)

This invention relates to the production of liquid carbon dioxide and particularly to the conversion of solid carbon dioxide to the liquid phase.

Liquid carbon dioxide has been produced and marketed in cylinders under pressure for many years and has been utilized for numerous industrial purposes including, for example, carbonation of beverages. In recent years, owing to the large industrial production of solid carbon dioxide, much of this material has been utilized by conversion to the liquid phase. A simple method of conversion consists in permitting the solid carbon dioxide to liquefy in a suitable container from which the liquid is withdrawn and delivered at the high pressure developed within the container to the cylinder in which it is transported. In another method the solid carbon dioxide is liquefied and then permitted to vaporize, the vapor being withdrawn at high pressure and condensed by indirect thermal contact with cooling water. The liquid thus produced is then delivered, at the high pressure developed, to the cylinders. In these methods, it is essential that pressures in excess of 1000 pounds per square inch be developed and maintained in the liquefiers. This necessitates liquefiers of strong construction capable of withstanding the pressures developed therein.

A further and more important difficulty with earlier methods results from the fact that oil is used as a plasticizer in the manufacture of solid carbon dioxide. The oil which is retained in the solid carbon dioxide enters the liquefier and inevitably contaminates the liquid product. When such liquid is utilized for industrial purposes, and especially in the carbonation of beverages, the oil, even in the small proportions present, imparts an unsatisfactory taste and odor to the beverage or other material treated, and not infrequently spoils the material so that it cannot be disposed of in commerce.

It is the object of the present invention to avoid the difficulties mentioned and especially to eliminate substantially all of the oil which may be present from the liquid product.

Another object of the invention is the provision of a method and apparatus permitting large scale conversion of solid carbon dioxide into liquid carbon dioxide which is substantially free from oil and impurities.

Another object of the invention is the provision of a method and apparatus for converting solid carbon dioxide into liquid carbon dioxide which is more economical in operation and ensures a better product than has been available as the result of methods heretofore in use.

Other objects and advantages of the invention will be apparent as it is better understood by reference to the following specification and accompanying drawing, which diagrammatically illustrates an apparatus suitable for the practice of the invention.

Solid carbon dioxide can be converted into liquid merely by utilizing the heat leak from the atmosphere into the converter, but the size of the equipment required to transfer, within a reasonable time, the necessary heat for liquefying large quantities of carbon dioxide makes this method inefficient and expensive. It is therefore necessary to apply heat, usually in the form of steam, in commercial practice. Since steam or some other form of heat energy is essential, it is of course desirable to minimize the amount of heat which must be applied, and this is accomplished in my method herein described.

I have discovered that oil and other relatively high boiling impurities in solid carbon dioxide can be removed and an oil free liquid product can be obtained providing the carbon dioxide is vaporized at low temperature and pressure and is reliquefied without undue contamination and that this can be accomplished in the operation embodying the principle of the invention as hereinafter described in more detail, with very low consumption of steam or heat and power.

Also in accordance with the procedure described herein, it is possible to operate the liquefiers and the remainder of the system at relatively low pressures, preferably lower than 300 pounds per square inch gauge. The system operates most satisfactorily at pressures above the triple point which must be maintained in order to ensure the maintenance of the liquid phase, or between 60 pounds and 150 pounds per square inch gauge. At such relatively low pressures the oil initially introduced with the solid carbon dioxide separates readily when the liquid carbon dioxide is vaporized, and remains in the liquid phase because of the relatively low temperature of the liquid at the lower pressures. The oil can be removed from the boilers from time to time as may be necessary, and absence of oil contamination from the condensed vapor which is delivered as the liquid product of the operation is thereby assured. Furthermore, the maintenance of low pressures in the liquefiers, boilers and other parts of the system permits the use of receptacles capable of holding a ton or more of solid carbon dioxide without unduly increasing the weight of the liquefiers or boilers in order to afford the strength required to permit operation at high pressures.

In carrying out the invention, I prefer to employ two or more and preferably three liquefiers. These may be receptacles of the usual construction made of steel or other suitable metal capable of withstanding the pressures employed. The details of such liquefiers are well known in the art and form no part of the present invention. The liquefiers are designed to facilitate the initial melting of the solid carbon dioxide and to maintain a supply of liquid to the boilers, two of which are employed preferably. The boilers may be similarly constructed of steel or suitable metal capable of withstanding the pressures employed, and are designed to facilitate vaporization of the liquid carbon dioxide. One of the boilers is provided with means permitting the application of a heating medium, preferably steam, and the other includes a coil adapted to be submerged in the liquid in which oil free carbon dioxide vapor from the steam heated boiler is condensed in heat exchange with the liquid. The condensed carbon dioxide vapor is delivered to a liquid receiver from which it may be withdrawn by a liquid pump and delivered at the desired pressure to the filling manifold and thence to the cylinders in which the liquid is transported. The boiler containing the condenser coil is operated at substantially the same pressure as the liquefiers, that is, at or somewhat above the triple point pressure, while the steam heated boiler is operated at a still higher pressure in order to effect condensation of the vapor in the condenser coil. For example, if the boiler containing the condenser coil is operated at 65 pounds per square inch pressure, the steam heated boiler may be required to operate at approximately 80 to 150 pounds per square inch, depending on the effectiveness of the condenser coil in the other boiler. It may be desirable also, although it is not essential, to employ a small rectifying column in connection with the first boiler, to which the vapor passes in contact with a circulated supply of liquid free from oil to finally wash any entrained oil from the vapor. The oil-free vapor is then condensed as previously described.

Throughout the system, low pressures are maintained up to the point where the liquid is pumped into the cylinders. The pressures should be below 300 pounds per square inch gauge, and preferably between 60 and 150 pounds per square inch gauge. Thus the liquefiers, the boilers and the remaining parts of the system are not subjected to high pressures heretofore considered necessary in the conversion of solid carbon dioxide to liquid. And, as previously indicated, because of the low temperatures, substantially none of the oil is carried over from the initial boiler with the carbon dioxide vapor and any remnant is removed before the vapor is finally condensed to produce the oil-free liquid product.

The system as described is extremely economical in the utilization of heat. In continuous operation the quantity of oil-free vapor passing from the steam heated boiler through the condensing coils submerged in the colder liquid in the lower pressure boiler is substantially equal to the quantity of solid carbon dioxide melted, and becomes the liquid product. However, due to the fact that the heat required to raise the solid carbon dioxide from its temperature at atmospheric pressure up to its temperature at the triple point, plus the heat required to melt the solid at the triple point, is equal to approximately 75% of the heat liberated when an equal weight of carbon dioxide vapor is condensed at the triple point, it is obvious that vapor equal to only 75% of the weight of the product need be admitted to the liquefiers to convert the solid to liquid. However, since condensation of the total product in the condensing coils evaporates substantially the same weight of liquid in this boiler by heat exchange, and since only 75% of this vapor goes to the liquefiers, the other 25% of the vapor must be diverted and brought back as efficiently as possible to the higher pressure steam heated boiler to become part of the product. The latter is accomplished by compressing this 25% fraction of the vapor up to the pressure of the steam heated boiler, and bubbling the vapor through the liquid in this boiler to remove any oil introduced by the oil lubricated compressor. Thus it is seen that 25% of the final oil-free product is produced from vapor passing through the steam heated boiler without requiring any steam, and that steam is required to vaporize liquid equal in quantity to only 75% of the product.

The liquid carbon dioxide discharged from the liquefiers comprises the liquid carbon dioxide resulting from the melting of the solid carbon dioxide and the liquid carbon dioxide resulting from condensation of the vapor from the low pressure boiler which is passed back to the liquefiers to melt the solid carbon dioxide. The liquid carbon dioxide resulting from the condensation of the returned vapor is equal to 75% of the amount of liquid resulting from the melting of the solid carbon dioxide. Thus, due to the return of carbon dioxide to the liquefiers, the amount of liquid carbon dioxide withdrawn from any one liquefier is equal to 175% of the amount of solid carbon dioxide melted therein, although, of course, the oil-free liquid product withdrawn from the system is equal only to 100% of the amount of solid carbon dioxide melted in the respective liquefiers.

Since the quantity of liquid evaporated in the steam heated boiler is equal in amount to only 75% of the quantity of liquid produced by melting the solid carbon dioxide, such quantity of liquid is pumped into the high pressure boiler from the liquefiers. An amount of liquid equal to the remaining 25% of the quantity of liquid produced by melting the solid carbon dioxide, plus the amount of liquid produced by condensation of the vapor returned to the liquefiers for melting the solid carbon dioxide, the total amount of which substantially will be equal in amount to the total amount of liquid resulting from the melting of the solid carbon dioxide, is passed into the lower pressure boiler which substantially is at the same pressure as the liquid discharged from the liquefiers.

The power required for the compression of the vapor must be taken into account in the cost of operation, and in accordance with the procedure described herein this amount of power is reduced to about 25% as compared with operations in which all of the production is compressed in the vapor phase.

In order that the invention may be more clearly understood, reference is made to the accompanying drawing. The temperatures and pressures and other details hereinafter mentioned are merely illustrative of the preferred embodiment of the invention in its practical application to the commercial production of liquid carbon dioxide. Other pressures and temperatures may be used, so long as the fundamental purpose is maintained, that is, causing the entire product to pass through the vapor phase, utilizing the refrigeration effect of melting solid to condense a large portion of the vapor phase and condensing the remainder by heat exchange with the liquid phase. The operation as thus carried out is economical, both with respect to the installation and maintenance of the apparatus and the power consumed in the operation.

Referring to the drawing, 5, 6 and 7 indicate liquefiers of suitable construction. The liquefiers are provided with outlet pipes 8, 9 and 10 controlled respectively by valves 11, 12 and 13 and connected to a liquid conduit 14 which delivers the liquid to a boiler 15 of suitable construction through a liquid pump 16, valve 19 controlled by a float 20 and pipe 18. The pump 16 maintains the desired pressure in the boiler 15.

The second boiler 17 is connected to the conduit 14, and liquid flows to the boiler 17 at approximately the pressure of the liquefier from which the liquid is withdrawn. Heat is supplied to the boiler 15 by a suitable steam jacket 21 supplied with steam through a pipe 22 which is controlled by a valve 23. Thus the liquid entering the boiler 15 is vaporized therein by heat supplied for example in the form of steam. The balance of the liquid from the liquefier is delivered to the boiler 17, where it is vaporized by heat exchange with carbon dioxide in the vapor phase delivered from the boiler 15 through a pipe 25 and thence to a coil 26 submerged in the liquid in the boiler 17.

In coil 26 the vapor is condensed and is delivered as oil-free liquid through a pipe 27 to a liquid receiver 28. The liquid is withdrawn from the liquid receiver 28 through a pipe 29 by a liquid pump 30 which delivers it through a pipe 31 to the filling manifold (not shown).

Vapor from the boiler 17 escapes through a pipe 32, and a portion thereof is diverted through a pipe 33, and one or more of the pipes 34, 35 and 36 controlled by valves 37, 38 and 39, to the liquefiers 5, 6, and 7. Here the vapor serves to impart the necessary heat to the solid carbon dioxide to cause liquefaction thereof, the vapor being condensed likewise to liquid. All of the liquid is withdrawn from the liquefiers as required to supply the boilers 15 and 17.

The balance of the vapor from the boiler 17 passes through an exchanger 40 where it gives up its cold to vapor returning as hereinafter described. The vapor thus raised in temperature passes through a pipe 41 to a compressor 42 where its pressure is increased. It is delivered through a pipe 43 to a cooler 44 which may be supplied with water or other cooling medium through a pipe 45. The water escapes through a pipe 46. Thus the heat of compression is removed from the vapor and the latter is delivered through a pipe 47 to an oil separator 48 having a partition 49 which serves to separate any entrained oil particles. The vapor then passes through a pipe 50 to the exchanger 40 where it picks up the cold from the vapor delivered from the boiler 17.

The cold vapor then passes through a pipe 51 to a distributor 52 in the boiler 15 which permits the vapor to bubble through the liquid contained in the boiler. The oil-free vapor then escapes through the pipe 25 as previously described and is condensed as the liquid product of the operation.

If additional precautions are desired to eliminate any possible trace of oil, a rectifier 53 is mounted on the boiler 15 and is provided with the usual trays 54 and caps 55. Overflow pipes 56 and 57 are provided to permit the downward travel of pure liquid carbon dioxide supplied by a pipe 58 controlled by a valve 59. The pure liquid carbon dioxide is withdrawn from the delivery line of the liquid product pump 30. The vapor from the boiler 15 bubbles upwardly through the trays 54 in contact with pure liquid and then escapes through the pipe 25 as previously described.

In the operation of the apparatus, it is necessary first to obtain a supply of liquid sufficient to bring the liquid to the proper levels in the boilers 15 and 17. The liquid may be introduced from any source, but preferably it is produced in the liquefiers which may be filled initially with solid carbon dioxide. The latter when liquefied will afford a sufficient supply of liquid to commence operation. Thereafter the liquefiers are preferably filled in sequence, that is to say one liquefier is filled with solid carbon dioxide and liquefaction is initiated therein so that the second liquefier is ready to supply liquid when the liquid from the first liquefier has been exhausted. Obviously any number of liquefiers may be employed, and the particular sequence of operation is of no importance so long as sufficient liquid is maintained in the boilers. Steam is supplied to the boiler 15 and is controlled by the valve 23 to maintain the desired production rate. A portion of the vapor from the boiler 17 is utilized in melting the solid carbon dioxide, and the balance of the vapor is conveyed through the system as hereinbefore described, returning to the coil 26 in the boiler 17 to assist in the vaporization of the liquid therein and being thereby condensed to liquid which is free from oil impurities.

If the liquefiers and boiler 17 are operated at the triple point of carbon dioxide, the pressure at these points in the system will be approximately 60 pounds per square inch gauge with a corresponding temperature of —70° F. Boiler 15 will be operated at a higher pressure and temperature sufficient to effect condensation of the vapor product in the coil of boiler 17. This pressure may be approximately 100 pounds per square inch with a corresponding temperature of —49° F. If the liquefiers and boiler 17 are operated at pressures above the triple point, the pressures and temperatures throughout the apparatus will be correspondingly raised. In passing through the exchanger 40, the temperature of the vapor is raised to approximately 68° F. After compression, the vapor is at approximately 167° F., and is cooled in the cooler 44 to approximately 86° F. At the latter temperature and at a pressure of approximately 100–150 pounds per square inch gauge, the vapor is returned to bubble through the liquid in the boiler 15 and if desired, through pure liquid in the rectifier 53. Any oil which may be initially present in the liquid or in the vapor which is returned, is retained in the boilers 15 and 17 and may be withdrawn therefrom as desired. Before returning to the boiler 15, the temperature of the vapor is reduced in the exchanger 40 to approximately —33° F. The vapor product from boiler 15 including the portion returned by compression from boiler 17 is delivered to coil 26 in boiler 17 at a temperature of approximately —49° F. where it is readily condensed and delivered to the receiver 28.

As will be readily understood, many of the details such as pressure gauges, sight gauges, pressure relief valves, drain pipes and other valves which are common in this type of apparatus are not illustrated and described, since they form no part of the invention and would be applied and utilized in similar arrangements by anyone skilled in the art. The omission of such illustration and description is merely to simplify the specification and to clarify the invention and the essential features thereof.

The method and apparatus as described afford considerable economy both in installation and maintenance, but are particularly effective in the large scale production of liquid carbon dioxide free from oil contamination.

Various changes may be made in the form and arrangement of the apparatus as well as in the details of operation, without departing from the invention or sacrificing the advantages thereof.

I claim:

1. The method which comprises melting solid carbon dioxide in a zone maintained at a pressure above the triple point pressure, introducing into each of two vaporizing zones, one of which is maintained at a higher pressure than the other, a portion of the resulting liquid carbon dioxide, applying heat to one of the vaporizing zones to vaporize the liquid carbon dioxide therein, passing the resulting vapor into heat exchange relation with liquid carbon dioxide in the other vaporizing zone to condense said vapor and to vaporize the liquid carbon dioxide in said other vaporizing zone with the latent heat of said vapor, passing vapors from said other vaporizing zone into heat exchange relation with the solid carbon dioxide in the melting zone to supply the heat necessary to melt the solid carbon dioxide and simultaneously to condense the vapors, and so correlating the rate of supply of liquid carbon dioxide to the vaporizing zones with the rate of withdrawal of vapors therefrom that liquid carbon dioxide is maintained in each vaporizing zone.

2. The method which comprises melting solid carbon dioxide in a zone maintained at a pressure above the triple point pressure and below approximately 300 lbs. per square inch gauge pressure, introducing into each of two vaporizing zones, one of which is maintained at a higher pressure than the other, a portion of the resulting liquid carbon dioxide, applying heat to one of the vaporizing zones to vaporize the liquid carbon dioxide therein, passing the resulting vapor into heat exchange relation with liquid carbon dioxide in the other vaporizing zone to condense said vapor and to vaporize the liquid carbon dioxide in said other vaporizing zone with the latent heat of said vapor, passing vapors from said other vaporizing zone into heat exchange relation with the solid carbon dioxide in the melting zone to supply the heat necessary to melt the solid carbon dioxide and simultaneously to condense the vapors, and so correlating the rate of supply of liquid carbon dioxide to the vaporizing zones with the rate of withdrawal of vapors therefrom that liquid carbon dioxide is maintained in each vaporizing zone.

3. The method which comprises melting solid carbon dioxide in a zone maintained at a pressure above the triple point pressure, introducing into each of two vaporizing zones, one of which is maintained at a higher pressure than the other, a portion of the resulting liquid carbon dioxide, applying heat to the vaporizing zone operating at the higher pressure to vaporize liquid carbon dioxide therein, passing the resulting vapor into heat exchange relation with liquid carbon dioxide in the vaporizing zone of lower pressure to condense said vapor and to vaporize liquid carbon dioxide in said vaporizing zone of lower pressure, passing vapors from the vaporizing zone of lower pressure into heat exchange relation with the solid carbon dioxide in the melting zone to supply the heat necessary to melt the solid carbon dioxide and simultaneously to condense the vapor, and so correlating the rate of supply of liquid carbon dioxide to the vaporizing zones with the rate of withdrawal of vapors therefrom that liquid carbon dioxide is maintained in each vaporizing zone.

4. The method which comprises melting solid carbon dioxide in a zone maintained at a pressure above the triple point pressure, introducing into each of two vaporizing zones, one of which is maintained at a higher pressure than the other, a portion of the resulting liquid carbon dioxide, applying heat to the vaporizing zone operating at the higher pressure to vaporize liquid carbon dioxide therein, passing the resulting vapor into heat exchange relation with liquid carbon dioxide in the vaporizing zone of lower pressure to condense said vapor and to vaporize liquid carbon dioxide in said vaporizing zone of lower pressure, passing a portion of the vapor from the vaporizing zone of lower pressure into heat exchange relation with the solid carbon dioxide in the melting zone to supply the heat necessary to melt the solid carbon dioxide and simultaneously to condense the vapor, compressing the remainder of the vapor from the vaporizing zone of lower pressure, combining the compressed vapor with the vapor from the vaporizing zone of higher pressure, and so correlating the rate of supply of liquid carbon dioxide to the vaporizing zones with the rate of withdrawal of vapors therefrom that liquid carbon dioxide is maintained in each vaporizing zone.

5. The method which comprises melting solid carbon dioxide in a zone maintained at a pressure above the triple point pressure, introducing into each of two vaporizing zones, one of which is maintained at a higher pressure than the other, a portion of the resulting liquid carbon dioxide, applying heat to the vaporizing zone operating at the higher pressure to vaporize liquid carbon dioxide therein, passing the resulting vapor into heat exchange relation with liquid carbon dioxide in the vaporizing zone of lower pressure to condense said vapor and to vaporize liquid carbon dioxide in said vaporizing zone of lower pressure, washing the vapor from the vaporizing zone of higher pressure with liquid resulting from the condensation of vapor in the vaporizing zone of lower pressure, passing vapors from the vaporizing zone of lower pressure into heat exchange relation with the solid carbon dioxide in the melting zone to supply the heat necessary to melt the solid carbon dioxide and sumultaneously to condense the vapor, and so correlating the rate of supply of liquid carbon dioxide to the vaporizing zones with the rate of withdrawal of vapors therefrom that liquid carbon dioxide is maintained in each vaporizing zone.

6. The method which comprises melting solid carbon dioxide in a zone maintained at a pressure above the triple point pressure to provide a supply of liquid carbon dioxide, withdrawing liquid carbon dioxide from said supply, maintaining and vaporizing a portion of the withdrawn liquid carbon dioxide at a pressure higher than that under which said supply of liquid carbon dioxide is maintained, vaporizing another portion of the withdrawn liquid carbon dioxide at substantially the pressure under which said supply of liquid carbon dioxide is maintained, passing a portion of the vapor from the lower pressure vaporizing zone to the melting zone for condensation by heat exchange with the melting solid, compressing the remainder of the vapor from the lower pressure vaporizing zone, and condensing the vapor from the higher pressure vaporizing zone by indirect heat exchange with the liquid carbon dioxide vaporizing in the lower pressure vaporizing zone.

7. The method which comprises melting solid carbon dioxide in a zone maintained at a pressure above the triple point pressure to provide a supply of liquid carbon dioxide, withdrawing liquid carbon dioxide from said supply, maintaining and vaporizing a portion of the withdrawn liquid carbon dioxide at a pressure higher than that under which said supply of liquid carbon dioxide is maintained, vaporizing another portion of the withdrawn liquid carbon dioxide at substantially the pressure under which said supply of liquid carbon dioxide is maintained, passing a portion of the vapor from the lower pressure vaporizing zone to the melting zone for condensation by direct heat exchange with the melting solid, compressing the remainder of the latter vapor to the pressure existing in the higher pressure vaporizing zone, introducing the compressed vapor directly into the liquid carbon dioxide in the higher pressure vaporizing zone, and passing the vapor from the higher pressure vaporizing zone into indirect contact with the liquid carbon dioxide in the lower pressure vaporizing zone to condense said vapor.

8. The method which comprises melting solid carbon dioxide at a pressure above the triple point pressure, withdrawing portions of the resulting liquid carbon dioxide, vaporizing one portion of the withdrawn liquid carbon dioxide at a pressure above a certain value, vaporizing another portion of the withdrawn liquid carbon dioxide at a pressure below said certain value, compressing vapor resulting from the vaporization at the lower pressure, and liquefying the vapor resulting from the vaporization at the higher pressure by heat exchange with the liquid evaporating at the lower pressure.

9. The method which comprises melting solid carbon dioxide at a pressure above the triple point pressure and below approximately 300 lbs. per square inch gauge, withdrawing portions of the resulting liquid carbon dioxide, vaporizing one portion of the withdrawn liquid carbon dioxide at a pressure above a certain value, vaporizing another portion of the withdrawn liquid carbon dioxide at a pressure below said certain value, compressing vapor resulting from the vaporization in the lower pressure, and liquefying the vapor resulting from the vaporization at the higher pressure by heat exchange with the liquid evaporating at the lower pressure.

10. The method which comprises melting solid carbon dioxide at a pressure above the triple point pressure, withdrawing portions of the resulting liquid carbon dioxide, vaporizing one portion of the withdrawn liquid carbon dioxide at a pressure above a certain value, vaporizing another portion of the withdrawn liquid carbon dioxide at a pressure below said certain value, passing a portion of the vapor from one of said vaporizations into direct contact with the solid carbon dioxide to melt the solid carbon dioxide and simultaneously to condense the vapor, compressing a portion of the vapor resulting from the vaporization at the lower pressure, and combining the compressed vapor with the vapor resulting from the vaporization at the higher pressure.

11. The method which comprises melting solid carbon dioxide at a pressure above the triple point pressure, withdrawing portions of the resulting liquid carbon dioxide, vaporizing one portion of the withdrawn liquid carbon dioxide at a pressure above a certain value, vaporizing another portion of the withdrawn liquid carbon dioxide at a pressure below said certain value, passing a portion of the vapor resulting from the vaporization at the lower pressure into heat exchange relation with the solid carbon dioxide to melt the solid carbon dioxide and simultaneously to condense the vapor, and compressing the remainder of the vapor resulting from the vaporization at the lower pressure.

12. The method which comprises melting solid carbon dioxide at a pressure above the triple point pressure, withdrawing portions of the resulting liquid carbon dioxide, vaporizing one portion of the withdrawn liquid carbon dioxide at a pressure above a certain value, vaporizing another portion of the withdrawn liquid carbon dioxide at a pressure below said certain value, compressing vapor resulting from the vaporization at the lower pressure, combining the compressed vapor with the vapor resulting from the vaporization at the higher pressure, and liquefying the combined vapor by heat exchange with the liquid carbon dioxide vaporizing at the lower pressure.

13. The method which comprises melting solid carbon dioxide at a pressure above the triple point pressure, withdrawing portions of the resulting liquid carbon dioxide, vaporizing one portion of the withdrawn liquid carbon dioxide at a pressure above a certain value, vaporizing another portion of the withdrawn liquid carbon dioxide at a pressure below said certain value, compressing vapor resulting from the vaporization at the lower pressure, combining the compressed vapor with the vapor resulting from the vaporization at the higher pressure by bubbling the compressed vapor through the liquid carbon dioxide vaporizing at the higher pressure, so that it combines with the vapor resulting from the vaporization at the higher pressure, and liquefying the combined vapor by heat exchange with the liquid carbon dioxide vaporizing at the lower pressure.

14. The method which comprises melting solid carbon dioxide at a pressure above the triple point pressure, withdrawing portions of the resulting liquid carbon dioxide, vaporizing one portion of the withdrawn liquid carbon dioxide at a pressure above a certain value, vaporizing another portion of the withdrawn liquid carbon dioxide at a pressure below said certain value, compressing vapor resulting from the vaporization at the lower pressure, combining the compressed vapor with the vapor resulting from the vaporization at the higher pressure, liquefying the combined vapor by heat exchange with the liquid carbon dioxide vaporizing at the lower pressure, and washing the combined vapor with liquid previously produced by liquefying the combined vapors by heat exchange with the liquid carbon dioxide vaporized at the lower pressure.

15. The method of producing oil-free liquid carbon dioxide from oil-contaminated solid carbon dioxide which comprises melting oil-contaminated solid carbon dioxide in a melting zone, introducing into each of two vaporizing zones, one of which is maintained at a higher pressure than the other, a portion of the resulting liquid carbon dioxide, applying heat to one of the vaporizing zones to vaporize the liquid carbon dioxide therein, passing the resulting vapor into heat exchange relation with liquid carbon dioxide in the other vaporizing zone to condense said vapor to form oil-free liquid carbon dioxide and to vaporize the liquid carbon dioxide in said other vaporizing zone with the latent heat of said vapor, passing vapors from said other vaporizing zone into heat exchange relation with the oil-contaminated solid carbon dioxide in the melting zone to supply the heat necessary to melt the solid carbon dioxide and simultaneously to condense the vapors, and so correlating the rate of supply of liquid carbon dioxide to the vaporizing zones with the rate of withdrawal of vapors therefrom that liquid carbon dioxide is maintained in each vaporizing zone.

WOLCOTT DENNIS.